US006972877B1

(12) United States Patent
Nakamura (10) Patent No.: US 6,972,877 B1
(45) Date of Patent: Dec. 6, 2005

(54) IMAGE READING APPARATUS (75) Inventor: Yoichi Nakamura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 1019 days.

(21) Appl. No.: 09/605,736

(22) Filed: Jun. 29, 2000

(30) Foreign Application Priority Data

Jun. 30, 1999 (JP) ................................ 11-185268

(51) Int. Cl.$^7$ ............................................. H04N 1/04
(52) U.S. Cl. ...................... 358/474; 358/497; 358/509; 358/475; 355/71.67
(58) Field of Search ............................... 358/474, 497, 358/509, 513, 496, 486, 487, 482, 475; 355/71, 355/67

(56) References Cited

U.S. PATENT DOCUMENTS

| | | | | |
|---|---|---|---|---|
| 5,266,805 A | * | 11/1993 | Edgar ............................ | 250/330 |
| 5,650,863 A | * | 7/1997 | Utagawa et al. ............. | 358/475 |
| 5,912,747 A | * | 6/1999 | Murakami ..................... | 358/497 |
| 6,094,281 A | * | 7/2000 | Nakai et al. ................. | 358/512 |
| 6,421,079 B1 | * | 7/2002 | Truc et al. .................... | 348/96 |
| 6,437,358 B1 | * | 8/2002 | Potucek et al. ........... | 250/559.45 |
| 6,618,512 B1 | * | 9/2003 | Yamaguchi .................. | 382/319 |
| 6,775,419 B2 | * | 8/2004 | Maeda et al. ................ | 382/275 |
| 6,832,008 B1 | * | 12/2004 | Wada ........................... | 382/275 |

* cited by examiner

*Primary Examiner*—Kimberly Williams
*Assistant Examiner*—Negussie Worku
(74) *Attorney, Agent, or Firm*—Sughrue Mion, PLLC (57) ABSTRACT

An image reading apparatus in which highly accurate image reading can be carried out by using a line sensor. Light irradiated from a light source is divided into visible light or infrared light by a visible light filter or an infrared light filter, and irradiated onto an image frame of a photographic film. The light transmitted through the image frame is reflected by a mirror and made incident on a linear CCD via a lens unit. At this time, sub-scanning of the image frame is carried out by moving the mirror while the photographic film (i.e., image frame) is stopped, and a frame image is read by the linear CCD. In this way, image reading is carried out by using visible light and infrared light while the image frame is stopped. Accordingly, there is no positional displacement between visible light image data and infrared light image data, and the visible light image data can be corrected with high accuracy based on the infrared light image data.

8 Claims, 10 Drawing Sheets

IMAGE READING APPARATUS

BACKGROUND OF THE INVENTION

1. Field of the Invention

The present invention relates to an image reading apparatus which reads, with high accuracy, image information of an original by light transmitted therethrough or reflected thereby. More specifically, the present invention relates to an image reading apparatus which reads, with excellent accuracy, image information by using non-visible light.

2. Description of the Related Art

In recent years, there has been known a technology in which a frame image recorded on an original, such as a photographic film, is photoelectrically read by a reading sensor such as a CCD. Image processings including enlargement, reduction, various corrections, and the like are carried out on digital image data obtained by the reading, and an image is formed on a recording material by a laser beam which has been modulated based on the image-processed digital image data.

In such a technology where a frame image is digitally read by a reading sensor such as a CCD, in order to realize highly accurate image reading, a frame image is preliminarily read (so-called "pre-scanning"). Thereafter, reading conditions (for example, charge storage time of the CCD, the amount of light irradiated onto the frame image, and the like) corresponding to the density and the like of the frame image are determined, and the frame image is read again under the determined reading conditions (so-called "fine scanning").

A linear CCD is used in the above-described image reading system. Therefore, an original is read while being conveyed in a sub-scanning direction. At this time, in order to reduce effects on image reading resulting from dust adhering to or scratches formed on the original, light emitted from the light source is irradiated onto the original in a diffused manner.

Further, in order to perform image reading of higher quality, an image reading apparatus has been proposed in which inappropriate pixels generated by dust adhering to or scratches formed on the original are detected by irradiating infrared light onto the original and reading the transmitted light by using a CCD or the like, and data of the read image which has been detected by using the three primary colors of light is corrected.

When image reading is carried out by using a linear CCD as described above, image reading is carried out while the original is conveyed in the sub-scanning direction. Therefore, image reading with high accuracy may be hindered depending on the state in which the original is conveyed. Particularly with an image reading apparatus in which inappropriate pixels are detected by using infrared light and image data is corrected, the same image frame must be read at least two times, using infrared light and visible light. In this case, there has been a drawback in that correction of inappropriate pixels cannot be performed with high accuracy if positional displacement occurs between the image data obtained by the first image reading and the image data obtained by the second image reading.

In order to improve image reading accuracy, another method is also employed in which an area CCD is used to read an image on an original while the original is stationary. However, an area CCD is more expensive than a linear CCD. In addition, conveying of the original must be stopped each time the area CCD reads a frame image, and therefore, a drawback arises in that the processing speed markedly decreases, particularly in pre-scanning.

SUMMARY OF THE INVENTION

In order to overcome the aforementioned drawbacks, an object of the present invention is to provide an image reading apparatus which can read images with high accuracy while maintaining a high processing speed.

In accordance with a first aspect of the present invention, there is provided an apparatus for reading an image and producing electronic data representing the image, the apparatus comprising: (a) a carrier for receiving and supporting an image, and conveying the image along a path of travel; (b) a light source disposed along the path of travel and operable for irradiating the image with visible light and non-visible light; (c) an optical system disposed along the path of travel for collecting light after it has been irradiated upon the image from the light source, at least a portion of the optical system being movably mounted for movement back and forth along the path of travel; and (d) a line sensor system in optical communication with the optical system, which receives light collected by the optical system and produces electronic data in accordance with the light received.

According to the first aspect of the present invention, by irradiating visible light for image reading from the irradiation section onto the original, visible light transmitted through or reflected by the image at the reading position of the image frame is made incident on the line sensor. At this time, the reading position is moved relative to the stationary original (i.e., the image frame) by the sub-scanning section in the sub-scanning direction. Accordingly, the frame image is read and visible light image data is thereby obtained.

Subsequently, non-visible light for detecting inappropriate pixels is irradiated from the irradiation section onto the original. In this case as well, non-visible light image data of the image frame is obtained in the same way as in the case of visible light.

In the wavelength region of non-visible light, the output does not change in accordance with the frame image information of the original. However, if scratches or the like are present on the original, the output changes due to scattering of light. On the other hand, in the wavelength region of visible light, an image on the original can be reliably read. However, since scattered components of light are included in the image information which has been read, even when scratches or the like are present on the original, they cannot be recognized.

Accordingly, inappropriate pixels in the frame image are detected from a change in the output of the non-visible light image data, and the inappropriate pixels of the visible light image data for the same frame image are corrected by interpolation or the like. In this way, inappropriate pixels can be detected with high accuracy by irradiating not only the visible light for image reading but also the non-visible light for detecting inappropriate pixels, and high quality image reading can be effected by correcting the inappropriate pixels in the visible light image data.

Further, with the original stationary, visible light and non-visible light are irradiated from the irradiation section onto the same image frame, image reading is effected by the line sensor and the sub-scanning section, and visible light image data and non-visible light image data can thereby obtained. Accordingly, conveying of the original for sub-scanning is not necessary, and positional displacement between both visible light and non-visible light image data can be prevented. As a result, correction of image data can be carried out with high accuracy.

When the reading position is moved by the sub-scanning section in the sub-scanning direction, it is preferable that the moving direction of the reading position is reversed. For example, when visible light is irradiated, the reading position is moved in a first direction, and subsequently, when non-visible light is irradiated, the reading position is moved in a second direction. In this way, by switching the moving direction (i.e., the sub-scanning direction) to the opposite direction, the amount of scanning required for image reading is decreased, and the image reading time is shortened.

Moreover, pre-scanning is carried out in such a manner that the original is conveyed by the sub-scanning section at a constant speed while the reading position of the line sensor is fixed. Thus, pre-scanning can be carried out at a high speed as compared with a case in which an area sensor is used for pre-scanning and the original is stopped for each image frame.

In accordance with a second aspect of the present invention, in the first aspect, the apparatus further comprises a drive assembly supporting the portion of the optical system and at least a portion of the line sensor system, the drive assembly being operable for moving the portion of the optical system and the portion of the line sensor system together back and forth along the path of travel.

According to the second aspect of the present invention, the line sensor is moved in the sub-scanning direction while the original is stationary. Therefore, the reading position of the image frame to be read by the line sensor is moved in the sub-scanning direction, and reading of the frame image can thereby be effected.

In accordance with a third aspect of the present invention, in the first aspect, the apparatus further comprises a drive assembly supporting the portion of the optical system, wherein the portion comprises a mirror oriented for reflecting light after it has been irradiated upon the image from the light source, and the drive assembly is operable for moving the mirror back and forth along the path of travel.

According to the third aspect of the present invention, the sub-scanning section moves the reading position of the image frame to be read by the line sensor in the sub-scanning direction by moving in the sub-scanning direction the mirror which deflects light transmitted through or reflected by the image frame so that the light is made incident on the line sensor. Therefore, the frame image can be read while the original is stationary.

Further, since the mirror is provided between the line sensor and the original, the optical path is refracted by the mirror. Accordingly, by changing the positions of the light source, the line sensor, and optical elements provided between the light source and the line sensor, for example, by disposing the mirror, the line sensor, and optical elements between the mirror and the line sensor parallel to the original, the image reading apparatus can be structured compactly.

In accordance with a fourth aspect of the present invention, in the third aspect, the optical system comprises optical elements optically disposed between the mirror and the line sensor system, with the optical elements and at least a portion of the line sensor system being supported by the drive assembly and moving together with the mirror when the drive assembly is operated.

According to the fourth aspect of the present invention, the mirror, the line sensor, and optical elements disposed between the mirror and the line sensor are integrally moved. Therefore, even if the mirror is moved in the sub-scanning direction, the optical path length is maintained constant during image reading. Consequently, image reading can be effected with high accuracy.

In accordance with a fifth aspect of the present invention, in the third aspect, the portion includes an optical assembly optically disposed between the mirror and the line sensor system, the optical assembly being syncronized for movement with the mirror and in the same direction when the mirror is moved, but at a movement rate substantially equal to one-half the movement rate of the mirror for maintaining a substantially constant optical path length between the mirror and the line sensor system.

According to the fifth aspect of the present invention, even when the positional relationship between the mirror and the line sensor is changed due to the movement of the mirror, the optical path length adjusting section maintains a constant optical path length extending from the mirror to the line sensor. Thus, images can be accurately read.

In accordance with a sixth aspect of the present invention, in the first aspect, the apparatus further comprises first and second filters movably mounted so as to be selectively insertable between the light source and the line sensor system, one of the filters being of the type that substantially transmits only visible light therethrough, and the other filter being of the type that substantially transmits only non-visible light therethrough.

According to the sixth aspect of the present invention, in a case in which the light source simultaneously emits visible light and non-visible light, by selectively inserting a filter which allows transmission of only visible light or non-visible light between the original and the light source, visible light or non-visible light can be irradiated onto the original, and visible light image data and non-visible light image data can be thereby obtained. At this time, image reading is effected by the sub-scanning section moving, in the sub-scanning direction, the reading position of the image frame to be read by the line sensor while the original is stationary. Accordingly, the positional relationship between the image frame and the light source is always constant, and therefore, images can be corrected with excellent accuracy.

In a seventh aspect of the present invention, in the first aspect, the light source is operable for separately emitting visible light and non-visible light.

According to the seventh aspect of the present invention, the irradiation section include a light source which separately emits visible light and non-visible light (for example, a light source in which light emitting elements which emit visible light or non-visible light are disposed). Therefore, by the light source separately emitting visible light and non-visible light, visible light image data and non-visible image data can be obtained without using color separation filters. Accordingly, the structure of the apparatus is simplified. Further, at this time, image reading is effected by the sub-scanning section moving, in the sub-scanning direction, the reading position of the image frame to be read by the line sensor, while the original is stationary. Thus, the positional relationship between the image frame and the light source is always constant, and as a result, images can be corrected with high accuracy.

In an eighth aspect of the present invention, in the seventh aspect, the light source includes a light emitting diode.

According to the eighth aspect, the light source includes a light emitting diode. Therefore, the heating value is relatively decreased as compared with the heating values of other light sources, and the life span is thereby extended. Accordingly, image reading can be carried out with excellent energy efficiency.

In a ninth aspect of the present invention, in the first aspect, the light source includes a light guide for directing irradiation to a limited section of the image, the light guide being mounted for movement substantially synchronously with the portion of the optical system.

According to the ninth aspect of the present invention, the irradiation section irradiates light only onto the reading position of the image frame to be read by the line sensor, and moves the irradiation position in the sub-scanning direction synchronously with the movement of the reading position by the sub-scanning section. Therefore, regardless of the movement of the reading position, the light irradiated from the irradiation section is always transmitted through or reflected by the image frame at the reading position, and by the transmitted or reflected light being made incident on the line sensor, image reading can be carried out for the frame image. At this time, light is irradiated only onto the reading position of the image frame. Accordingly, it is not necessary to irradiate light onto the entire image frame, and therefore, light can be efficiently used.

In accordance with a tenth aspect of the present invention, there is provided an apparatus for reading an image and producing electronic data representing the image, the apparatus comprising: (a) a carrier for receiving and supporting an image, and conveying the image along a path of travel; (b) a light source disposed along the path of travel and operable for irradiating the image with first and second types of light; (c) an optical system disposed along the path of travel for collecting and transmitting light after it has been irradiated upon the image from the light source, a least a portion of the optical system being movably mounted for motorized movement back and forth along the path of travel; (d) a line sensor system optically connected to the optical system, which receives light collected by the optical system and produces electronic data in accordance with the light received; and (e) a control system electronically connected to, and controlling, the carrier, light source, optical system, and line sensor system, the control system being operable to control the light source to irradiate the image separately with the first and second types of light, receive electronic data produced by the line sensor after irradiation by each type of light by moving the portion of the optical system back and forth along the path of travel, and correct data produced by irradiation with one type of light, based on data produced by irradiation with the other type of light.

In accordance with an eleventh aspect of the present invention, there is provided an image reading apparatus which reads, by using visible light for image reading and non-visible light for detecting inappropriate pixels, a frame image recorded on an image frame of an original, and, based on a position of an inappropriate pixel which position is obtained by irradiating the non-visible light for detecting inappropriate pixels, corrects the image data of the inappropriate pixel, the image reading apparatus comprising: an irradiation section for irradiating onto the original the visible light for image reading and the non-visible light for detecting inappropriate pixels; a line sensor which reads image information in lines along a main scanning direction by light which is one of transmitted through and reflected by the image frame being made incident on the line sensor; and a sub-scanning section for, while the original is stationary, moving, in a sub-scanning direction, a reading position of the image frame to be read by the line sensor.

In a twelfth aspect of the present invention, in the eleventh aspect, the sub-scanning section moves at least the line sensor in the sub-scanning direction.

In a thirteenth aspect of the present invention, in the eleventh aspect, further comprises a mirror which deflects the light which is one of transmitted through and reflected by the image frame so that the light is made incident on the line sensor, wherein the sub-scanning section moves the mirror in the sub-scanning direction.

In a fourteenth aspect of the present invention, in the thirteenth aspect, the sub-scanning section integrally moves, in the sub-scanning direction, the mirror, the line sensor, and optical elements disposed between the mirror and the line sensor.

In a fifteenth aspect of the present invention, in the eleventh aspect, the sub-scanning section includes an optical path length adjusting section for maintaining an optical path length constant even when the positional relationship between the mirror and the line sensor is changed due to the movement of the mirror.

In a sixteenth aspect of the present invention, in the eleventh aspect, the irradiation section includes: a light source which simultaneously emits visible light for image reading and non-visible light for detecting inappropriate pixels; and a filter switching section for selectively inserting one of at least two types of filters between the light source and the line sensor, the at least two types of filters being at least one filter which transmits only visible light and at least one filter which transmits only non-visible light.

In a seventeenth aspect of the present invention, in the eleventh aspect, the irradiation section includes a light source which separately emits at least visible light for image reading and non-visible light for detecting inappropriate pixels.

In an eighteenth aspect of the present invention, in the seventeenth aspect, the light source is a light emitting diode.

In a nineteenth aspect of the present invention, in the eleventh aspect, the irradiation section irradiates light only onto the reading position of the image frame and moves an irradiation position in the sub-scanning direction synchronously with movement of the reading position by the sub-scanning section.

DESCRIPTION OF THE PREFERRED EMBODIMENTS

Figure 1:
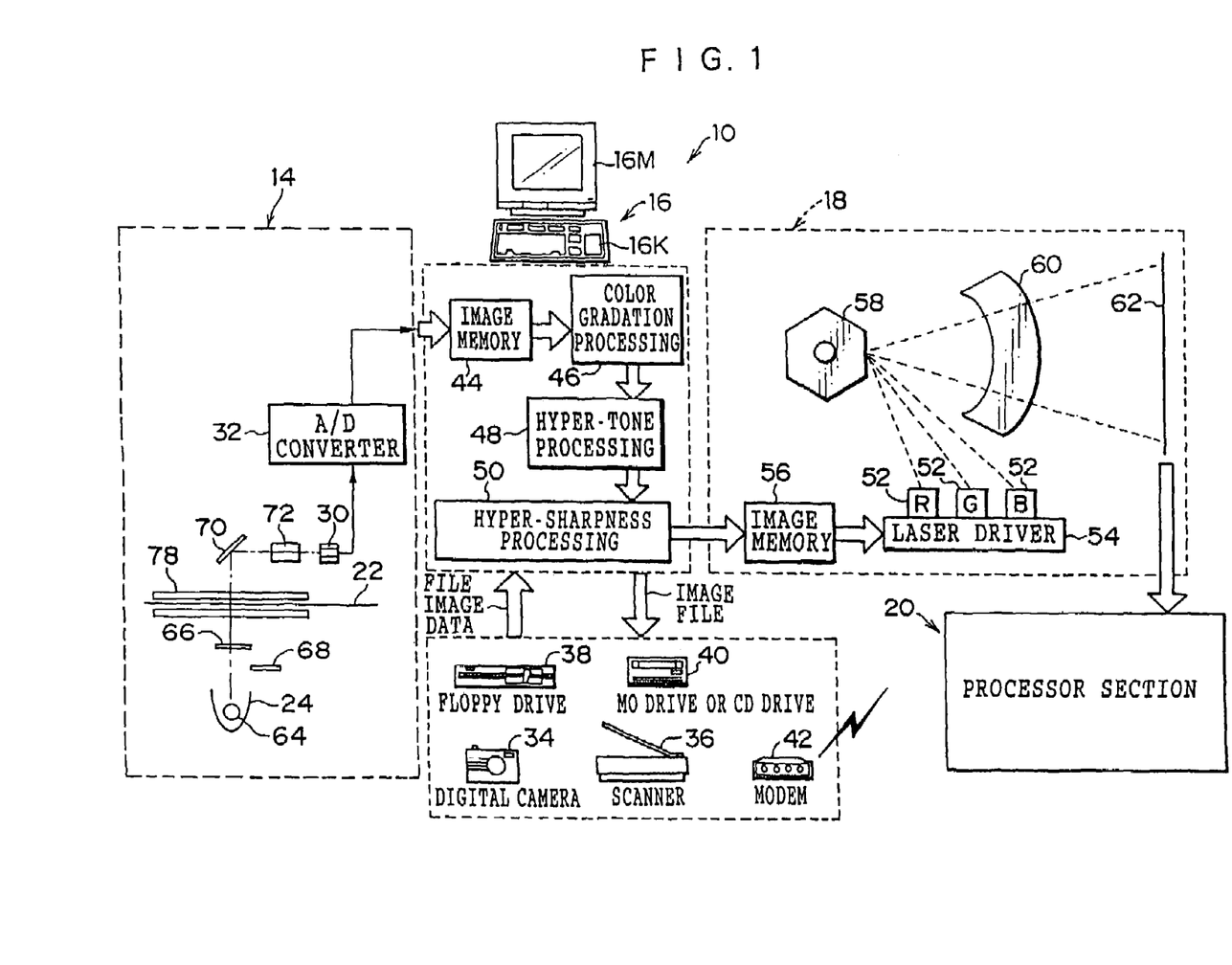
FIG. 1 is a schematic structural diagram of a digital laboratory system in accordance with a first embodiment of the present invention.
Figure 2:
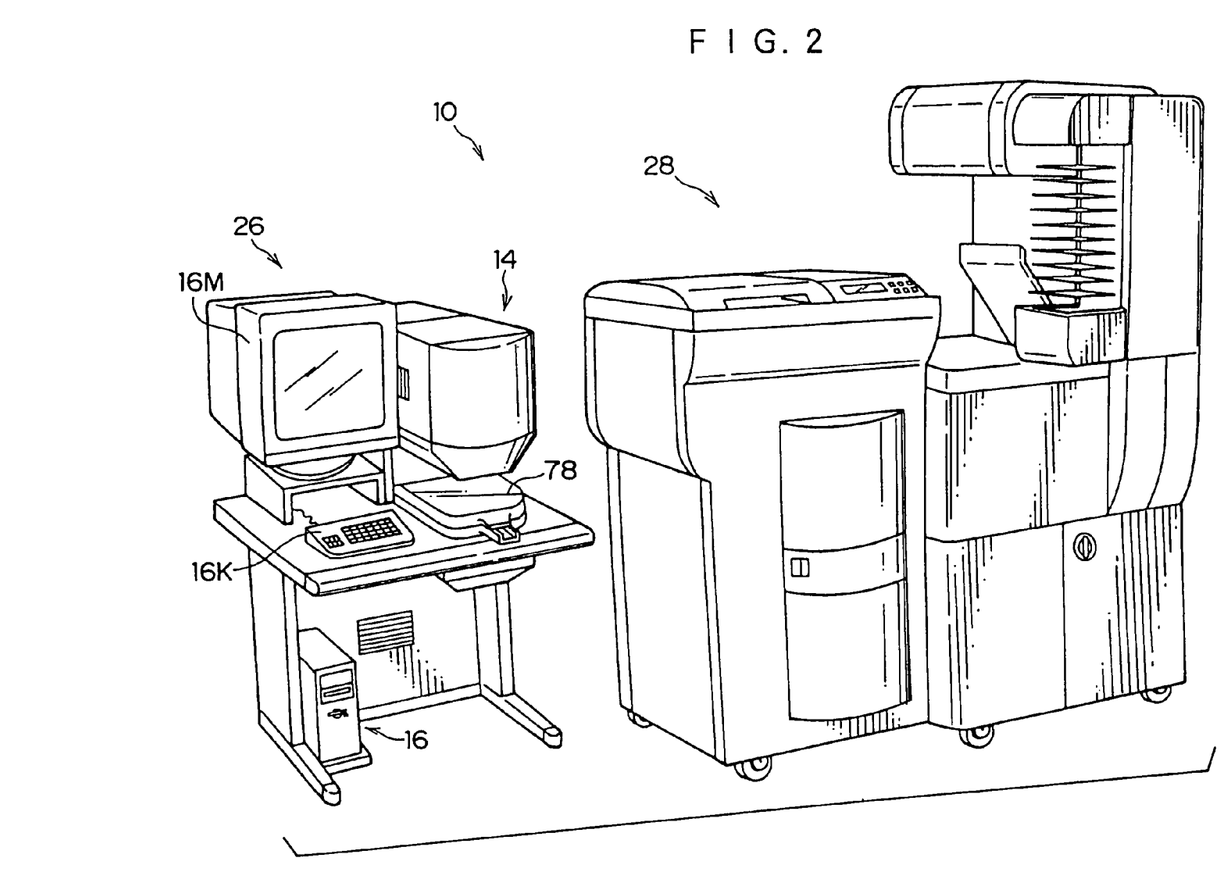
FIG. 2 is a view illustrating the exterior of the digital laboratory system.

FIGS. 1 and 2 each show a schematic structure of a digital laboratory system 10 in accordance with a first embodiment of the present invention.

As shown in FIG. 1, this digital laboratory system 10 is structured to include a linear CCD scanner 14, an image processing section 16, a laser printer section 18, and a processor section 20. The linear CCD scanner 14 and the image processing section 16 are integrated to form an input section 26 shown in FIG. 2, while the laser printer section 18 and the processor section 20 are integrated to form an output section 28 shown in FIG. 2.

The linear CCD scanner 14 is used to read a frame image recorded on a photographic film such as a negative film or a reversal film. Examples of the photographic film whose frame image can be read include a 135-size photographic film, a 110-size photographic film, a photographic film with a transparent magnetic layer formed thereon (i.e, a 240-size photographic film which is a so-called APS film), and 120-size and 220-size (Brownie size) photographic films. The linear CCD scanner 14 reads the frame image to be read with a linear CCD 30. Thereafter, image data obtained by the linear CCD 30 is subjected to analog-to-digital conversion by an A/D converter 32, and the converted digital image data is outputted to the image processing section 16.

In the present embodiment, a 135-size photographic film 22 is used in the digital laboratory system 10.

The image processing section 16 is structured to allow input of image data (scan image data) outputted from the linear CCD scanner 14, and also allow input of image data obtained by photographing using a digital camera 34 or the like, image data obtained by reading an original (e.g., a reflection original or the like) by a scanner 36 (flat bed type), image data generated by another computer and recorded on a floppy disc drive 38, an MO drive or a CD drive 40, or communications image data received via a modem 42 from the outside.

The image processing section 16 stores the inputted image data in an image memory 44, effects image processings such as various corrections through the use of such portions as a color gradation processing portion 46, a hyper-tone processing portion 48, or a hyper-sharpness processing portion 50, and then outputs the image-processed image data, as image data for recording, to the laser printer section 18. Further, the image processing section 16 can also output the image data subjected to the image processing, as an image file, to the outside (for example, can output the image data to a recording medium such as a FD, a MO, a CD, or the like, or can transmit the image data to other information processing equipment via a communications line).

The laser printer section 18 is equipped with red (R), green (G), and blue (B) laser light sources 52, and controls a laser driver 54 so that laser light modulated in accordance with the image data for recording inputted from the image processing section 16 (and temporarily stored in an image memory 56) is irradiated onto a photographic printing paper 62 and an image is recorded thereon by the scanning exposure (in the present embodiment, an optical system mainly using a polygon mirror 58 and an fθ lens 60 is used). Further, the processor section 20 subjects the photographic printing paper 62, upon which an image has been recorded by the scanning exposure in the laser printer section 18, to various processings including color development, bleaching fixing, washing, and drying. As a result, an image is formed on the photographic printing paper 62.

Figure 3:
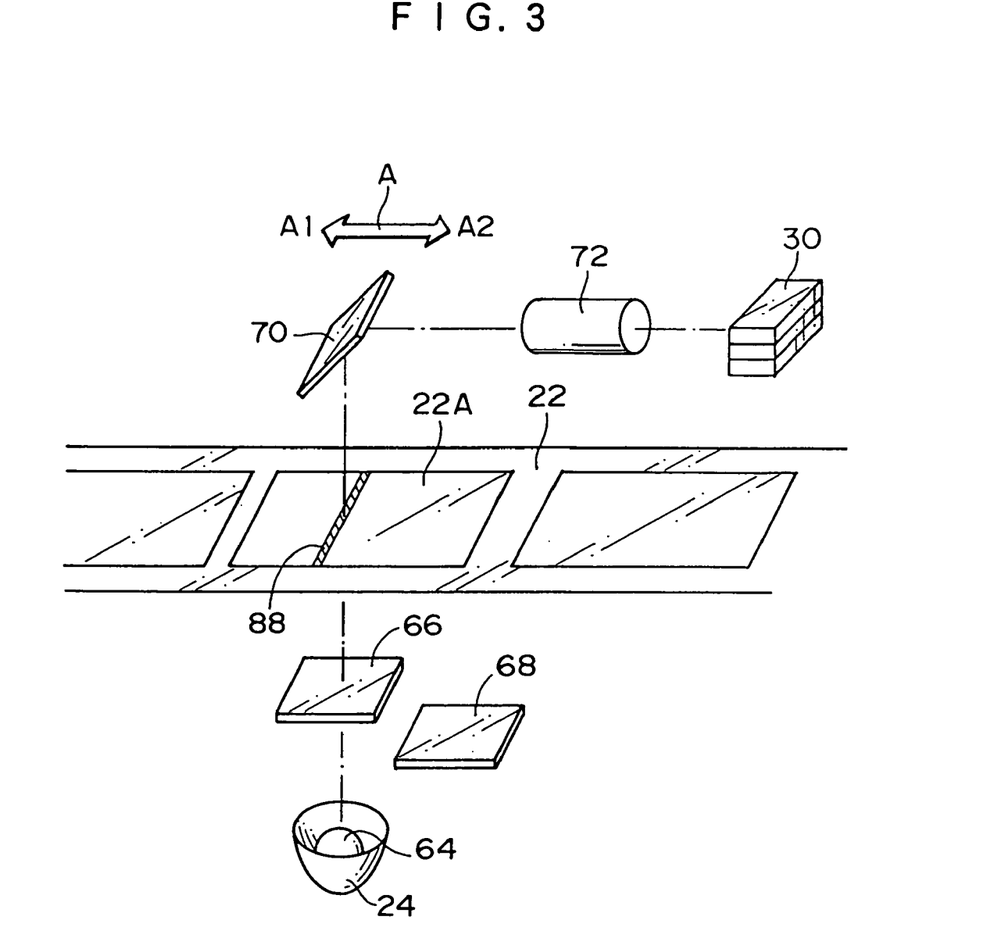
FIG. 3 is a perspective view showing the schematic structure of an optical system of a linear CCD scanner in accordance with the first embodiment of the present invention.

Structure of the Linear CCD Scanner:

Next, a description will be given of the structure of the linear CCD scanner 14. FIG. 3 shows a schematic structure of an optical system of the linear CCD scanner 14.

This optical system is equipped with a light source 64 formed by a metal halide lamp, a halogen lamp, or the like. A parabolic reflector 24 is provided so that the light source 64 is disposed at a focal point position. Light emitted from the light source 64 and reflected by the reflector 24 is irradiated toward the photographic film 22.

Disposed on the light-exiting side of the light source 64 are a visible light filter 66 which transmits only visible light components of the light emitted from the light source 64, and an IR filter 68 which transmits only IR (infrared light) components of the emitted light. The visible light filter 66 and the IR filter 68 are structured so as to be alternately insertable onto an optical path which extends from the light source 64 to the photographic film 22. Accordingly, by alternately disposing the visible light filter 66 and the IR filter 68 on the optical path, visible light or infrared light is irradiated from the light source 64 onto the photographic film 22.

The photographic film 22 is conveyed by a film carrier 78 (see FIG. 1) and stopped at a predetermined position. After a frame image has been read, the photographic film 22 is conveyed by a distance which corresponds to the pitch of the image frame.

Figure 4:
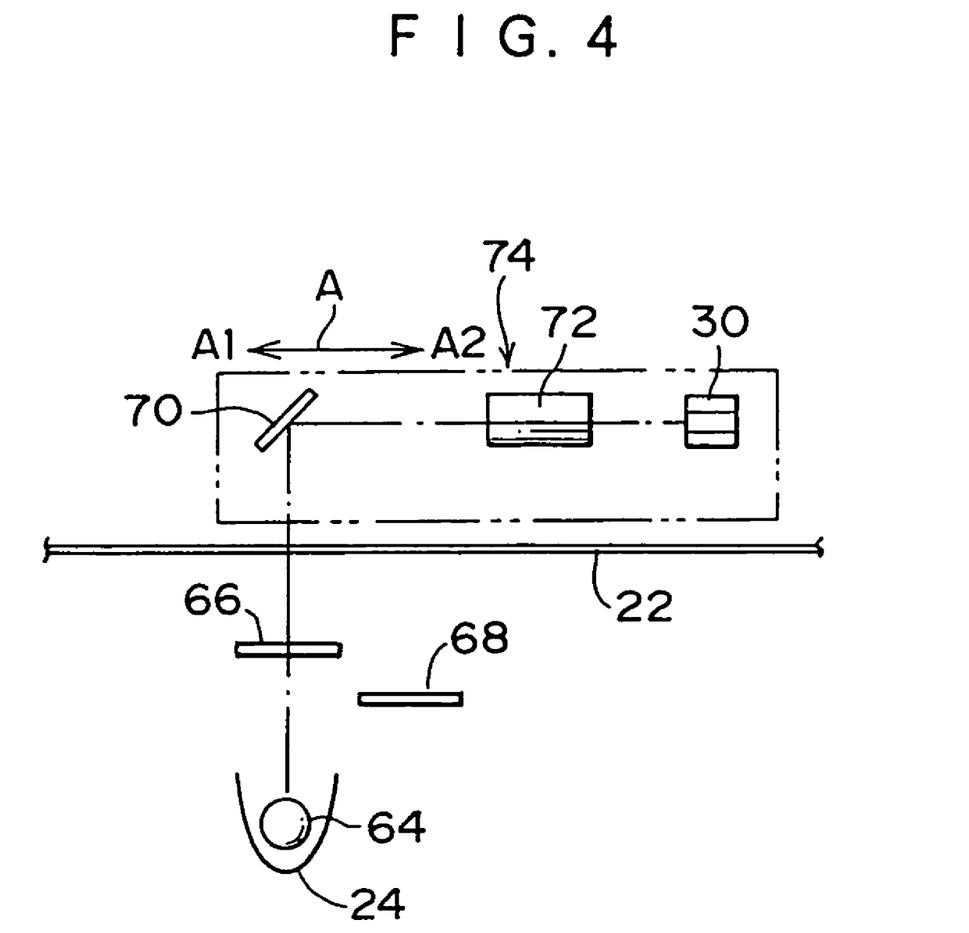
FIG. 4 is a side view showing the schematic structure of the optical system of the linear CCD scanner in accordance with the first embodiment of the present invention.

As shown in FIGS. 3 and 4, a mirror 70 which reflects the light transmitted through the photographic film 22, a lens unit 72 which converges the light reflected by the mirror 70, and the linear CCD 30 disposed at an imaging position are disposed in that order at the side of the photographic film 22 opposite the side at which the light source 64 is provided. The transmitted light reflected by the mirror 70 is converged by the lens unit 72 and imaged onto the linear CCD 30.

The mirror 70, the lens unit 72 and the linear CCD 30 are structured so as to be integrally movable by a scanning mechanism 74 (see FIG. 4) substantially parallel to the photographic film 22 (i.e., the image frame).

Figure 5:
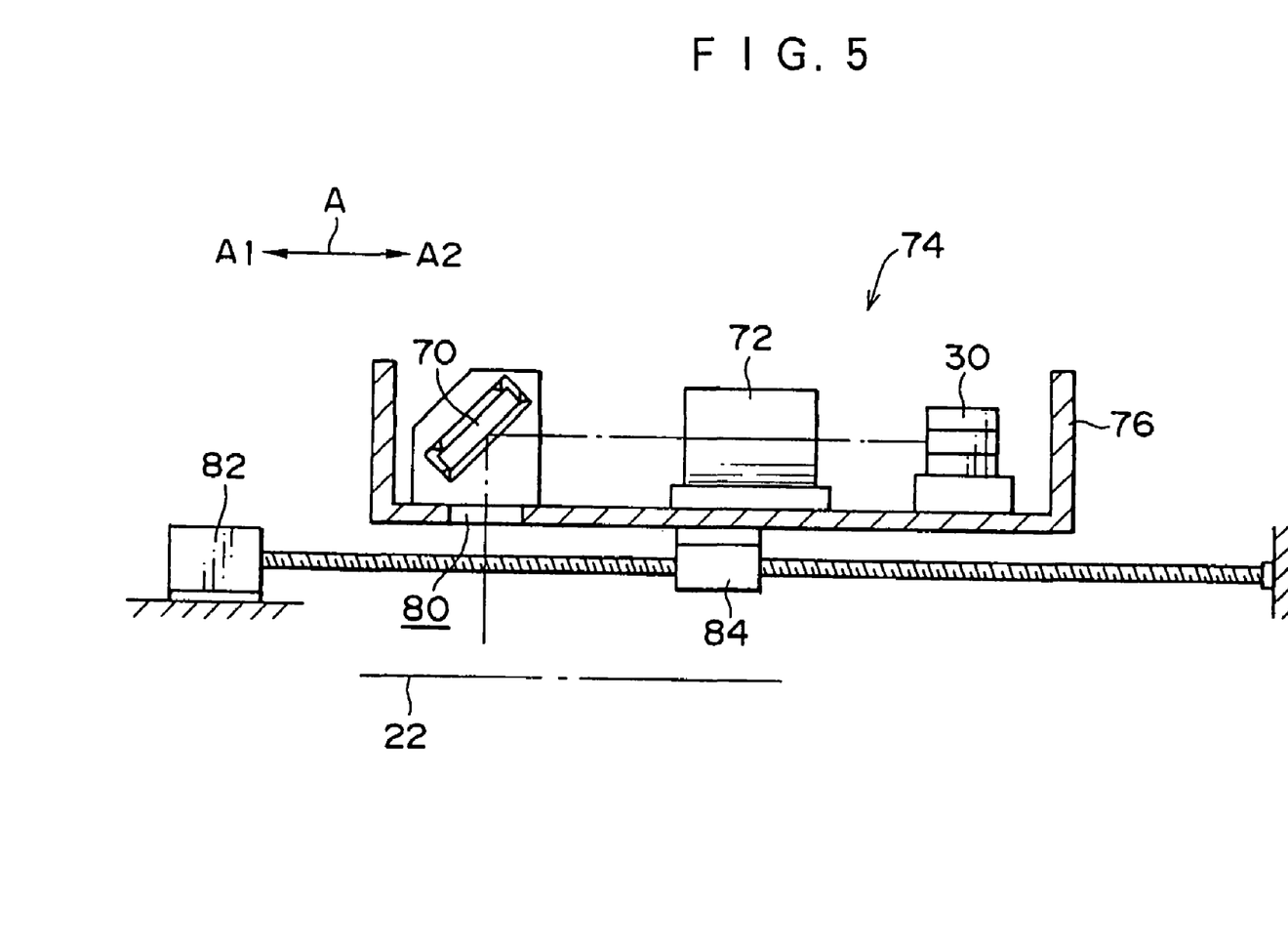
FIG. 5 is a side view showing the schematic structure of a scanning mechanism in accordance with the first embodiment of the present invention.

As shown in FIG. 5, the scanning mechanism 74 is structured in such a manner that a housing 76, within which the mirror 70, the lens unit 72 and the linear CCD 30 are fixed, is moved in the directions in which the photographic film 22 is conveyed (i.e., in the directions of arrow A) by a driving force of a motor 82 via a ball screw 84. Further, a hole 80 is formed in the bottom surface of the housing 76. The light entering the inside of the housing 76 through the hole 80 is reflected and deflected at an angle of 90° by the mirror 70, and then enters the linear CCD 30 via the lens unit 72.

Accordingly, by the housing 76 being moved in a direction of arrow A at the time of reading an image, the mirror 70 is moved in a sub-scanning direction (in a direction of arrow A) relative to an image frame 22A (see FIG. 3) of the photographic film 22 whose conveying is stopped. As a result, a reading range 88 of the image frame 22A to be read by the linear CCD sensor 30 is moved in a direction of arrow A. Namely, sub-scanning is carried out.

When visible light and infrared light are successively irradiated onto the image frame at the time of fine scanning, by alternately moving the housing 76 in directions of arrows A1 and A2 (i.e., by effecting sub-scanning), the scanning (moving) distance is shortened as compared with a structure in which the housing 76 carries out sub-scanning in the same direction as the conveying direction of the photographic film 22.

Color filters are provided at the linear CCD 30. When visible light is made incident on the linear CCD 30, image reading for the respective colors of R, G, and B is carried out.

Shading correction data for visible light and infrared light is set and stored in the image memory 44 in advance.

Hereinafter, operation of the first embodiment will be described.

First, an operator loads the photographic film 22 in the film carrier 78. When an instruction to start reading a frame image is given by the operator via a keyboard 16K of the image processing section 16, pre-scanning is carried out in the film carrier 78 while the photographic film 22 is conveyed at a constant speed.

At this time, the scanning mechanism 74 is not activated, and the mirror 70 is stopped at a predetermined position. Further, the visible light filter 66 is disposed on the optical path.

Therefore, light emitted from the light source 64 is made into visible light by the visible light filter 66 and is irradiated onto the photographic film which is conveyed at the constant speed. The light transmitted through the image frame 22A is reflected by the mirror 70 and made incident on the linear CCD 30, where visible light image data for each image frame is read.

Moreover, not only data of the image frames but also various data of the photographic film 22 including data recorded outside the image recording areas is read by the linear CCD scanner 14. Read images are displayed on a monitor 16M.

Next, based on the results of pre-scanning of each frame image, reading conditions at the time of fine scanning (i.e., accumulation time of the linear CCD 30 for each color) are set for each frame image.

When setting of the reading conditions for fine scanning for all of the frame images is finished, the photographic film 22 is intermittently conveyed in a direction opposite the direction in which it is conveyed during the pre-scanning, and each frame image is fine-scanned.

In this case, the photographic film 22 is intermittently conveyed such that the photographic film 22 is stopped for each image frame, and after reading of the frame, the photographic film 22 is conveyed by the image frame pitch (i.e., by a length corresponding to the longitudinal length of the image frame plus the distance between this image frame and the next image frame).

First, visible light is irradiated onto the image frame 22A of the stopped photographic film 22 in the same way as in the pre-scanning. The transmitted light enters the housing 76 through the hole 80 and is reflected by the mirror 70 and made incident on the linear CCD 30. At this time, the housing 76 (i.e., the mirror 70) is moved in the sub-scanning direction (in a direction of arrow A) relative to the photographic film 22 which is stopped. Therefore, the reading range 88 of the image frame 22A to be read by the linear CCD 30 is moved in the sub-scanning direction (in a direction of arrow A). In this way, a frame image of the image frame 22A is read, and visible light image data (hereinafter referred to as "RGB image data") can be thereby obtained. Subsequently, the visible light filter 66 is withdrawn from the optical path, and the IR filter 68 is disposed on the optical path. By irradiating infrared light onto the photographic film 22, infrared light image data (hereinafter referred to as "IR image data") is obtained in the same way as in the case of visible light data.

At the time of fine scanning, the housing 76 is moved in the direction of arrow A1 when visible light is irradiated and in the direction of arrow A2 when infrared light is irradiated. As a result, the distance over which the housing 76 is moved (i.e., the scanning distance of the mirror 70) is shortened as compared with a structure in which the photographic film 22 is scanned in a single direction. Therefore, this leads to a shortening of the time required for image reading.

At this time, since a sufficient distance is ensured between the light source 64 and the mirror 70, even when the housing 76 (i.e., the mirror 70) is moved, the optical path length from the light source 64 to the mirror 70 can be regarded as being substantially constant. Further, since the mirror 70, the lens unit 72, and the linear CCD 30 are fixed within the housing 76, the optical path length from the mirror 70 to the linear CCD 30 is constant. Namely, regardless of the movement of the mirror 70 (i.e., sub-scanning), the optical path length from the light source 64 to the linear CCD 30 is always constant. Accordingly, images can be read with high accuracy.

At this time, the photographic film 22 is conveyed in the direction opposite to the direction the photographic film 22 is conveyed at the time of pre-scanning. Therefore, fine scanning is sequentially carried out from the last frame to the first frame. Further, the conditions of the image (for example, the aspect ratio of the photographed image, photographing conditions such as underexposure, normal exposure, overexposure or super overexposure, whether or not an electric flash was used, and the like) are recognized at the time of pre-scanning. Therefore, images can be read under appropriate reading conditions.

The RGB image data and the IR image data read in the above-described manner are subjected to shading correction according to respective shading correction values stored in the image memory 44.

Moreover, in the IR image data subjected to shading correction in the image processing section 16, a pixel having an output value below a threshold value is detected as a pixel, in a frame image, with a scratch formed thereon or dust, dirt or a fingerprint adhering thereto (i.e., an inappropriate pixel), and this inappropriate pixel in the RGB data is corrected by interpolation or the like. Consequently, the effects of scratches formed on the photographic film 22 and dust adhering thereto can be avoided at the time of image reading.

In this way, in the present embodiment, in spite of image reading being carried out by the linear CCD 30, the RGB image data and the IR image data can be read with high accuracy because the frame images are read with the photographic film 22 stopped (stationary). As a result, inappropriate pixels can be corrected with high accuracy.

Moreover, the film carrier 78 only needs to be stopped once for each image frame at the time of fine scanning. Accordingly, precise sub-scanning (conveying) is not necessary, and the structure can be made simple.

Further, with the linear CCD scanner 14, pre-scanning is carried out by conveying the photographic film 22 at a constant speed while the scanning mechanism 74 (i.e., the linear CCD 30) is stationary. Therefore, the processing (i.e., the pre-scanning) speed can be increased while high quality image reading is carried out. In addition, regardless of image reading (fine scanning) being carried out while the original is stationary, the linear CCD 30, rather than an area CCD, is used as the image reading section. Therefore, this leads to a reduction in cost.

Furthermore, shading correction can be effected with excellent accuracy by correcting image data by using shading correction values of visible light and infrared light.

Moreover, by deflecting the optical path by using the mirror 70 so that the lens unit 72 and the linear CCD 30 are disposed substantially parallel to the photographic film 22, the film scanner 14 is compactly structured.

In the present embodiment, a transmission original such as the photographic film 22 is the object to be read. However, the present embodiment can also be applied to reading of a reflection original. Further, in the present embodiment, although the visible light filter 66 and the IR filter 68 are disposed between the light source 64 and the path along which the photographic film 22 is conveyed, they can also be disposed between the path along which the photographic film 22 is conveyed and the linear CCD 30.

Figure 6:
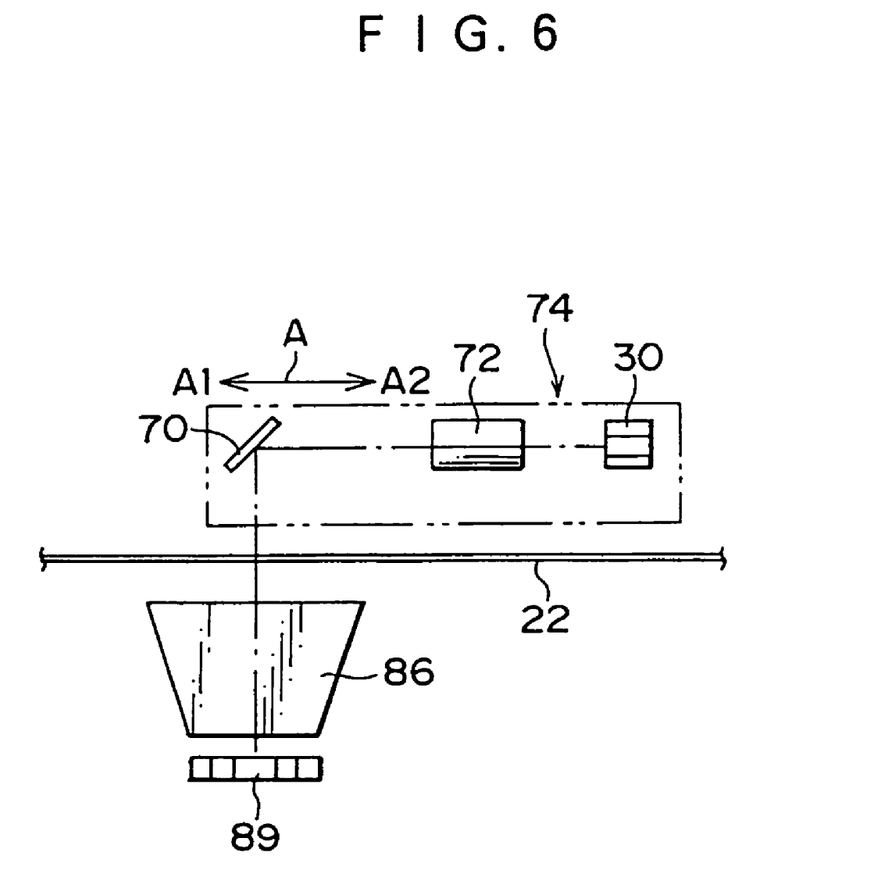
FIG. 6 is a side view showing the schematic structure of an optical system of a linear CCD scanner in accordance with a second embodiment of the present invention.

Next, an image reading apparatus in accordance with a second embodiment of the present invention will be described with reference to FIG. 6. Structural components of the second embodiment which are the same as those of the first embodiment are designated by the same reference numerals, and detailed description thereof will be omitted. In the present second embodiment, the only point different from the first embodiment concerns the light source 64 disposed in the linear CCD scanner 14. Therefore, description will be given of the light source only.

An optical system in the second embodiment includes a light emitting diode (hereinafter referred to as "LED") 89 as the light source. The LED 89 has a plurality of LED elements which emit red light, green light, blue light and infrared light (hereinafter occasionally referred to as R, G, B, and IR, respectively). The plural LED elements emitting light of any one of these types are arranged in array form on a substrate. Accordingly, by simultaneously turning on the LED elements of R, G, and B, white light (i.e., visible light) can be irradiated onto the photographic film 22. Further, by turning on the LED elements of IR only, infrared light can be irradiated onto the photographic film 22.

A light guide 86 is provided between the LED 89 and the photographic film 22. The light guide 86 diffuses, at the interior thereof, the light emitted from the LED 89 and irradiates the diffused light onto an entire image frame of the photographic film 22 in a uniform manner.

In the linear CCD scanner 14 having the above-described structure, pre-scanning and fine scanning are carried out in the same way as in the first embodiment. Namely, the IR image data and the RGB image data obtained in the same way as in the first embodiment are corrected by using respective shading correction values. Thereafter, inappropriate pixels are detected based on the IR image data, and the inappropriate pixels in the RGB image data are corrected. In this way, image reading which avoids the effects of scratches formed on the photographic film 22 and dust, dirt and a fingerprint adhering thereto can be carried out.

As described above, since the LED 89 serving as the light source includes the LED elements each of which can separately emit light of one of the respective colors, cutting filters are not necessary, and thus, the structure of the apparatus can be simplified.

Moreover, the LED 89, which is used as the light source, advantageously has a small heating value and a long life span as compared with a halogen lamp or the like. Therefore, image reading can be carried out with excellent energy efficiency. A fluorescent character display tube, EL (electroluminescence), and a plasma display also have the same effects when used as the light source.

Figure 7:
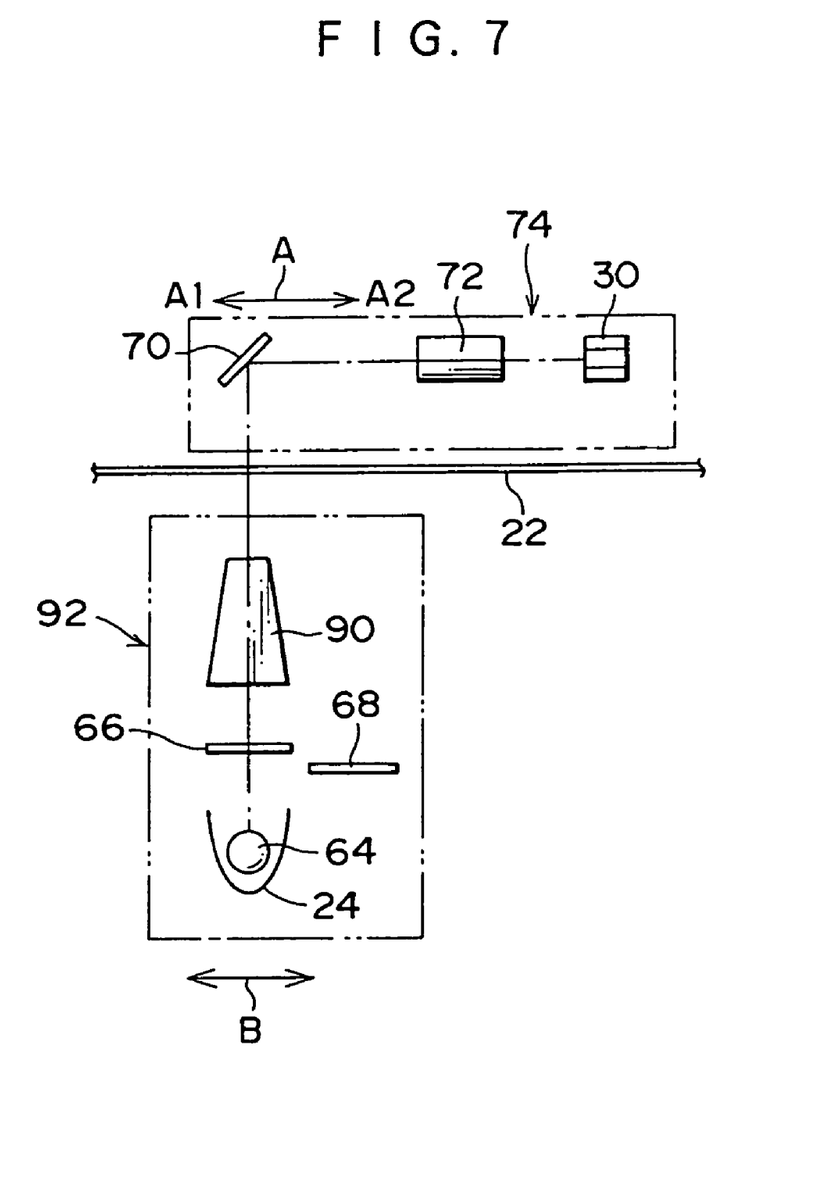
FIG. 7 is a side view showing the schematic structure of an optical system of a linear CCD scanner in accordance with a third embodiment of the present invention.
Figure 8:
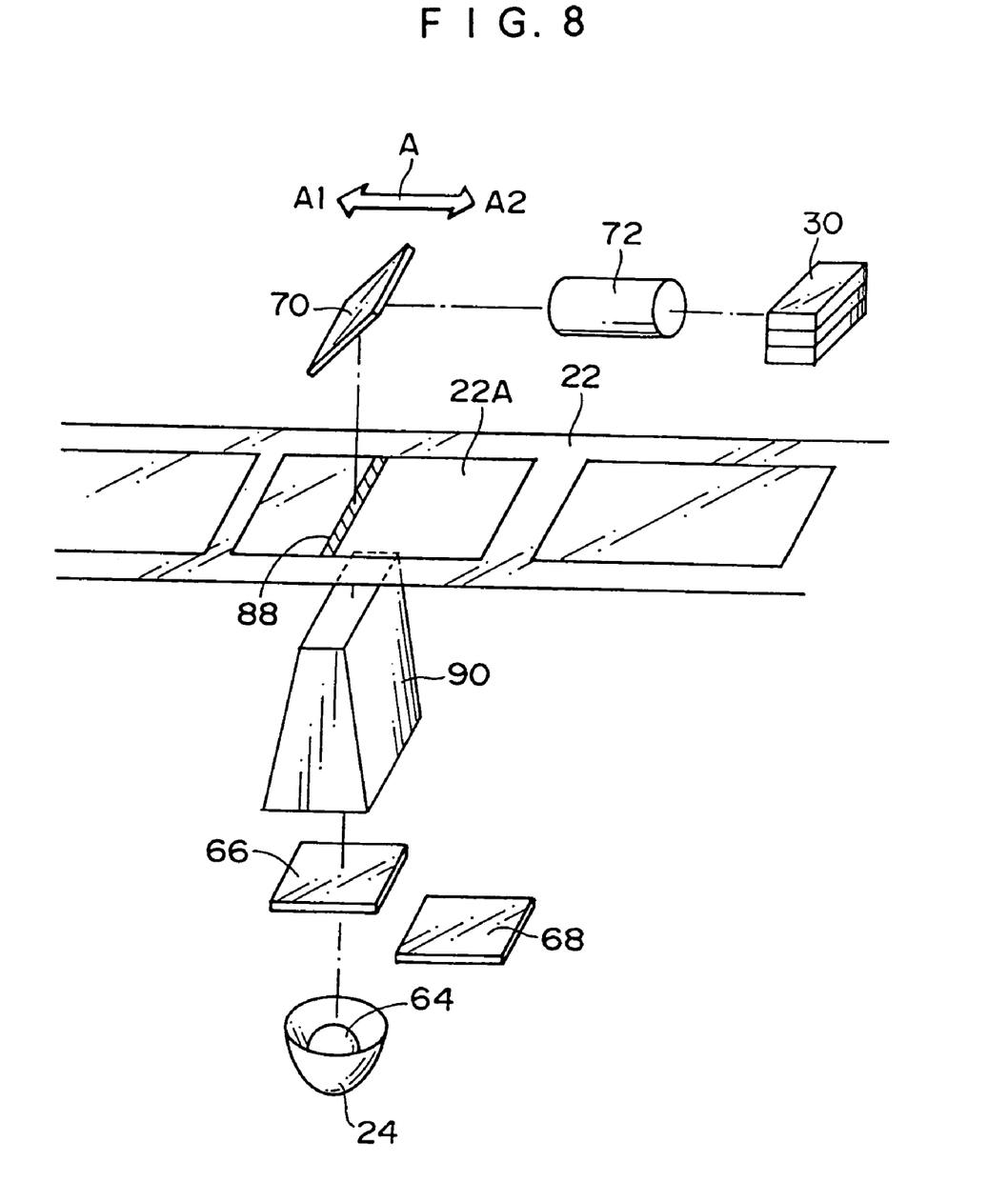
FIG. 8 is a perspective view showing the schematic structure of the optical system of the linear CCD scanner in accordance with the third embodiment of the present invention.

Further, an image reading apparatus in accordance with a third embodiment of the present invention will be described with reference to FIGS. 7 and 8. Structural components of the third embodiment which are the same as those of the first embodiment are designated by the same reference numerals, and detailed description thereof will be omitted. In the present embodiment, the only point different from the first embodiment concerns the light source disposed in the linear CCD scanner 14. Therefore, description will be given of the light source only.

The point different from the first embodiment is that, in the present third embodiment, a diffusion box 90 is disposed between, on the one hand, the visible light filter 66 and the IR filter 68, and on the other hand, the photographic film 22. The diffusion box 90 is structured so as to irradiate light only onto the reading range 88 of the image frame 22A (see FIG. 8).

Moreover, the light source 64, the visible light filter 66, the IR filter 68, and the diffusion box 90 can be integrally moved by a moving mechanism 92 in a direction (i.e., in a direction of arrow B) parallel to the direction in which the mirror 70 is moved (i.e., a direction of arrow A; the sub-scanning direction). As in the case of the scanning mechanism 74, the moving mechanism 92 has components disposed within an unillustrated housing and can be moved in a direction of arrow B by a ball screw or the like. Further, at the time of image reading, the moving mechanism 92 moves synchronously with the scanning mechanism 74 in the same direction at the same speed. Therefore, the light emitted from the light source 64 and irradiated via the diffusion box 90 onto the illuminated range (i.e., the reading range 88) of the image frame is made incident on the linear CCD 30 by the mirror 70. Moreover, since the light source 64, the visible light filter 66, the IR filter 68, and the diffusion box 90 are integrally moved by the moving mechanism 92, the optical path length from the light source 64 to the mirror 70 is maintained constant.

Operation of the third embodiment having the above-described structure will now be described.

In addition to the operation and effects which are the same as those in the first embodiment, since light is irradiated only onto the reading range 88 of the image frame 22A, the amount of irradiated light is small as compared with that of a structure in which light is irradiated onto the entire image frame. Accordingly, light can be efficiently used.

Figure 9:
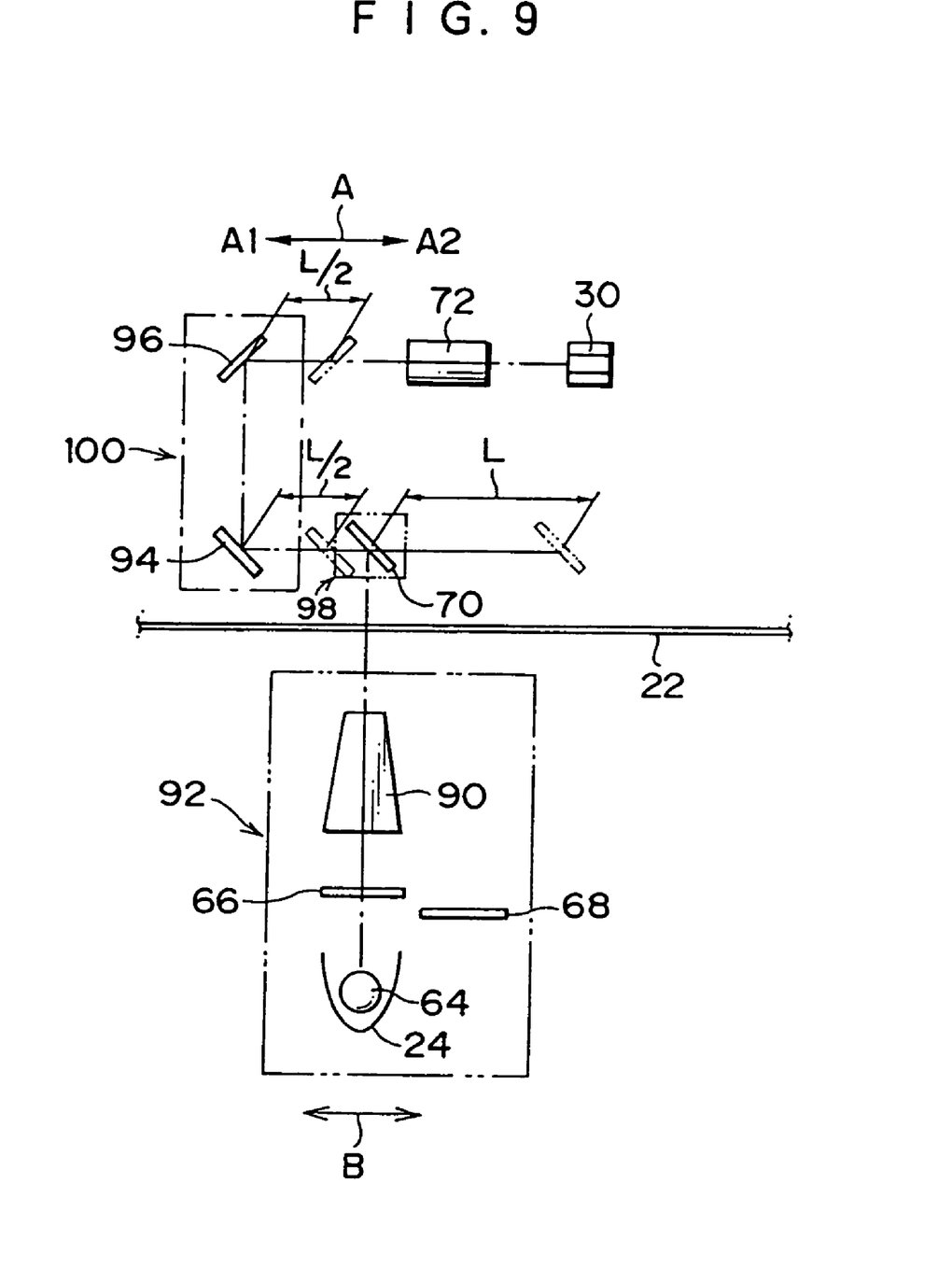
FIG. 9 is a side view showing the schematic structure of an optical system of a linear CCD scanner in accordance with a fourth embodiment of the present invention.

Next, an image reading apparatus according to a fourth embodiment of the present invention will be described with reference to FIG. 9. Structural components of the fourth embodiment which are the same as those of the third embodiment are designated by the same reference numerals, and detailed description thereof will be omitted. In the present embodiment, the only point different from the first embodiment concerns the linear CCD 30 disposed in the linear CCD scanner 14. Therefore, description will be given of the linear CCD 30 only.

Specifically, mirrors 94 and 96 are disposed between the mirror 70 and the lens unit 72. Therefore, the transmitted light refracted by the mirror 70 in a direction parallel to the photographic film 22 (i.e., in the direction of arrow A1) is then refracted by the mirrors 94 and 96 in the opposite direction (i.e., in the direction of arrow A2) and is made incident on the linear CCD 30 via the lens unit 72. The mirror 70 is structured so as to be moved (for sub-scanning) by the scanning mechanism 98 in the direction in which the photographic film 22 is conveyed (i.e., in a direction of arrow A). Moreover, the mirrors 94 and 96 are structured to be integrally movable by an adjustment mechanism 100 in the direction in which the photographic film 22 is conveyed (i.e., in a direction of arrow A), and are structured to move synchronously with the scanning mechanism 98 in the same direction at a moving speed which is half the moving speed of the scanning mechanism 98. Namely, if the scanning mechanism 98 (i.e., the mirror 70) is moved by a distance L, the adjustment mechanism 100 (i.e., the mirrors 94 and 96) are moved by a distance L/2. Accordingly, a change in the optical path length due to the movement of the mirror 70 (for sub-scanning) is offset by the movement of the adjustment mechanism 100 (the mirrors 94 and 96). Although not specifically illustrated, the scanning mechanism 98 and the adjustment mechanism 100 have substantially the same structures as those of the scanning mechanism 74 and the like.

With the above-described structure, the fourth embodiment has the operation and effects which are the same as those of the third embodiment. In addition, since a change in the optical path length due to the movement of the mirror 70 is offset by the movement of the adjustment mechanism 100, a constant optical path length is maintained, and the linear CCD 30 and the lens unit 72 do not have to be moved. As a result, highly accurate image reading can be carried out.

Figure 10:
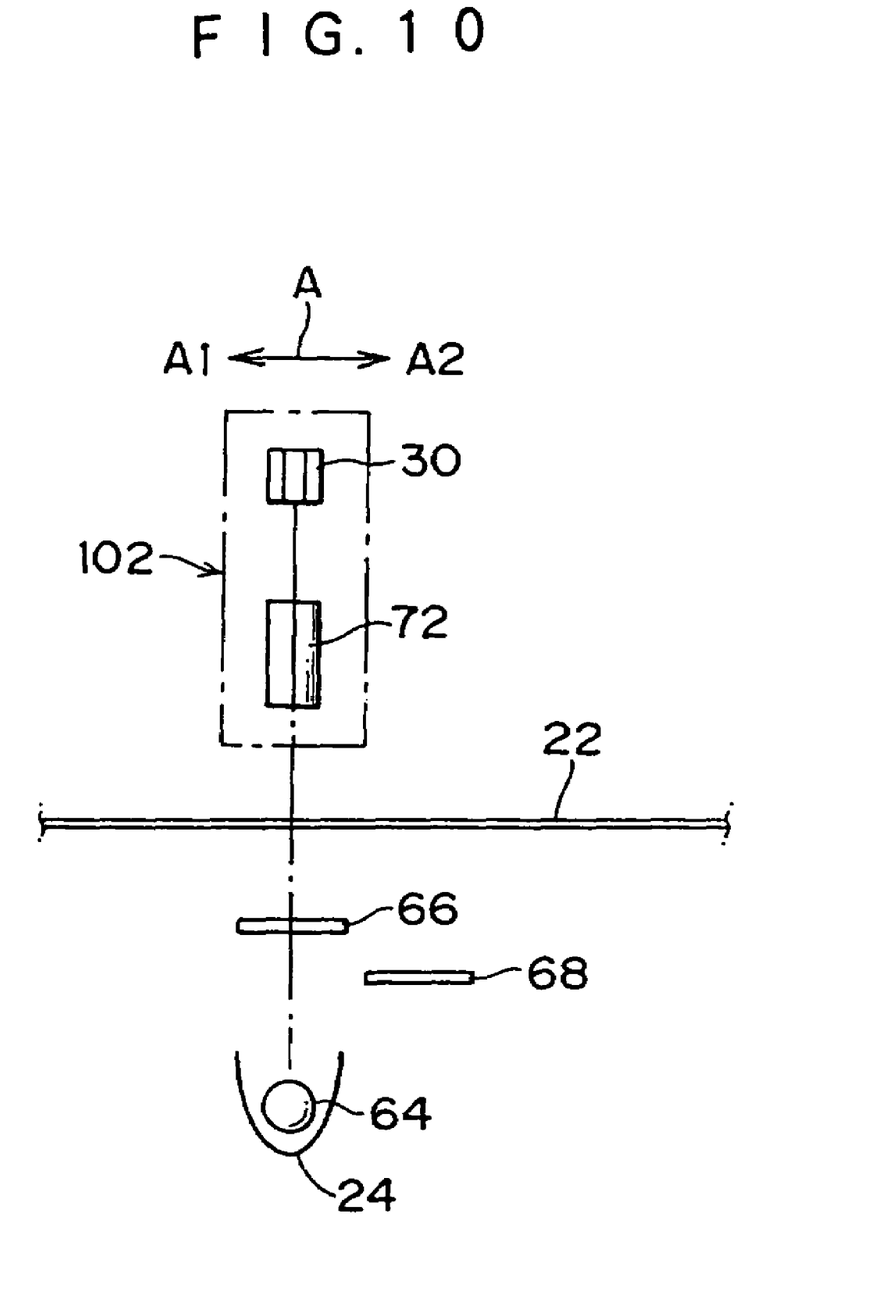
FIG. 10 is a side view showing the schematic structure of an optical system of a linear CCD scanner in accordance with a fifth embodiment of the present invention.

Embodiments have been described in which the mirror is moved for sub-scanning with respect to the film scanner 14. However, the present invention is not limited to these embodiments. For example, as shown in FIG. 10, a film scanner which does not use mirrors is also possible. In this film scanner, the lens unit 72 and the linear CCD 30 are disposed on an optical axis and integrally moved by a scanning mechanism 102.

As described above, the image reading apparatus according to the present invention has the excellent effect that effects on image reading resulting from scratches formed on an original or dust adhering thereto can be prevented by detecting inappropriate pixels with non-visible light and correcting the inappropriate pixels in visible light image data.

When image reading is effected using a line sensor in particular, a frame image is read in such a manner that an original (an image frame) is stationary and a reading position of the image frame to be read by the line sensor is moved in the sub-scanning direction by a sub-scanning section. Thus, the positional relationship between the light source and the original is fixed, and positional displacement between visible light image data and non-visible light image data can be prevented. Consequently, image data can be corrected with high accuracy. Moreover, the original does not need to be precisely conveyed at the time of image reading, thereby simplifying the structure of the system for conveying the original. Namely, highly accurate image reading is possible by using a simple structure.

Further, a line sensor, rather than an area sensor, is used to carry out image reading while an original is stationary. Therefore, the processing (i.e., the image reading) speed, especially the processing speed during pre-scanning, can be made high. Furthermore, a reduction in cost is made possible.

What is claimed is:

1. An apparatus for reading an image and producing electronic data representing the image, the apparatus comprising:
   a light source disposed along a path of travel of an image and operable for irradiating the image with visible light and non-visible light;
   an optical system disposed along the path of travel for collecting light after it has been irradiated upon the image from the light source,
   a line sensor system in optical communication with the optical system, which receives light collected by the optical system and produces electronic data in accordance with the light received, and
   first and second filters movably mounted so as to be selectively insertable between the light source and the line sensor system, one of the filters being of the type that substantially transmits only visible light therethrough, and the other filter being of the type that substantially transmits only non-visible light therethrough.

2. An image reading apparatus which reads, by using visible light for image reading and non-visible light for detecting inappropriate pixels, a frame image recorded on an image frame of an original, and, based on a position of an inappropriate pixel which position is obtained by irradiating the non-visible light for detecting inappropriate pixels, corrects the image data of the inappropriate pixel, said image reading apparatus comprising:
   an irradiation section for irradiating onto the original the visible light for image reading and the non-visible light for detecting inappropriate pixels;
   a line sensor which reads image information in lines along a main scanning direction by light which is one of transmitted through and reflected by the image frame being made incident on said line sensor;
   wherein said irradiation section includes:
   a light source which simultaneously emits visible light for image reading and non-visible light for detecting inappropriate pixels; and
   a filter switching section for selectively inserting one of at least two types of filters between the light source and the line sensor, said at least two types of filters being at least one filter which transmits only visible light and at least one filter which transmits only non-visible light.

3. An apparatus for reading an image and producing electronic data representing the image, the apparatus comprising:
   a carrier for receiving and supporting an image, and conveying the image along a path of travel;
   a light source disposed along the path of travel and operable for irradiating the image with visible light and non-visible light;
   an optical system disposed along the path of travel for collecting light after it has been irradiated upon the image from the light source, at least a portion of the optical system being movably mounted for movement back and forth along the path of travel;
   a line sensor system in optical communication with the optical system, which receives light collected by the optical system and produces electronic data in accordance with the light received; and
   first and second filters movably mounted so as to be selectively insertable between the light source and the line sensor system, one of the filters being of the type that substantially transmits only visible light therethrough, and the other filter being of the type that substantially transmits only non-visible light therethrough.

4. An image reading apparatus which reads, by using visible light for image reading and non-visible light for detecting inappropriate pixels, a frame image recorded on an image frame of an original, and, based on a position of an inappropriate pixel which position is obtained by irradiating the non-visible light for detecting inappropriate pixels, corrects the image data of the inappropriate pixel, said image reading apparatus comprising:

an irradiation section for irradiating onto the original the visible light for image reading and the non-visible light for detecting inappropriate pixels;

a line sensor which reads image information in lines along a main scanning direction by light which is one of transmitted through and reflected by the image frame being made incident on said line sensor; and a sub-scanning section for, while the original is stationary, moving, in a sub-scanning direction, a reading position of the image frame to be read by said line sensor, wherein said sub-scanning section moves at least said line sensor in the sub-scanning direction, a mirror which deflects the light which is one of transmitted through and reflected by the image frame so that the light is made incident on said line sensor, wherein said sub-scanning section moves said mirror in the sub-scanning direction, wherein said sub-scanning section includes an optical path length adjusting section for maintaining an optical path length constant even when the positional relationship between said mirror and said line sensor is changed due to the movement of said mirror.

5. An image reading apparatus which reads, by using visible light for image reading and non-visible light for detecting inappropriate pixels, a frame image recorded on an image frame of an original, and, based on a position of an inappropriate pixel which position is obtained by irradiating the non-visible light for detecting inappropriate pixels, corrects the image data of the inappropriate pixel, said image reading apparatus comprising:

an irradiation section for irradiating onto the original the visible light for image reading and the non-visible light for detecting inappropriate pixels;

a line sensor which reads image information in lines along a main scanning direction by light which is one of transmitted through and reflected by the image frame being made incident on said line sensor; and a sub-scanning section for, while the original is stationary, moving, in a sub-scanning direction, a reading position of the image frame to be read by said line sensor, wherein said sub-scanning section moves at least said line sensor in the sub-scanning direction, wherein said irradiation section includes:

a light source which simultaneously emits visible light for image reading and non-visible light for detecting inappropriate pixels; and a filter switching section for selectively inserting one of at least two types of filters between the light source and the line sensor, said at least two types of filters being at least one filter which transmits only visible light and at least one filter which transmits only non-visible light.

6. An apparatus for reading an image and producing electronic data representing the image, the apparatus comprising:

a carrier for receiving and supporting an image, and conveying the image along a path of travel;

a light source disposed along the path of travel and operable for irradiating the image with visible light and non-visible light;

an optical system disposed along the path of travel for collecting light after it has been irradiated upon the image from the light source, at least a portion of the optical system being movably mounted for movement back and forth along the path of travel; and a line sensor system in optical communication with the optical system, which receives light collected by the optical system and produces electronic data in accordance with the light received, wherein in a first direction, the light source irradiates the image with visible light and in a second direction opposite the first direction, the light source irradiates the image with non-visible light.

7. An apparatus for reading an image and producing electronic data representing the image, the apparatus comprising:

a carrier for receiving and supporting an image, and conveying the image along a path of travel;

a light source disposed along the path of travel and operable for irradiating the image with visible light and non-visible light;

an optical system disposed along the path of travel for collecting light after it has been irradiated upon the image from the light source, at least a portion of the optical system being movably mounted for movement back and forth along the path of travel;

a line sensor system in optical communication with the optical system, which receives light collected by the optical system and produces electronic data in accordance with the light received; and a diffuser disposed between the carrier and the light source.

8. An apparatus according to claim 7, wherein the diffuser is movable with the light source.

* * * * *